United States Patent [19]

Peise et al.

[11] 4,343,626
[45] Aug. 10, 1982

[54] REACTOR FOR PRODUCING A CARBON MONOXIDE AND HYDROGEN CONTAINING GAS

[75] Inventors: Helmut Peise, Freiberg; Wolfgang Heinrich, Freiberg; Peter Göhler, Freiberg; Friedrich Berger, Brand-Erbisdorf; Klaus Lucas, Freiberg; Manfred Schingnitz, Freiberg; Dieter König, Freiberg, all of German Democratic Rep.; Aleksander Jegorow, Moskwa, U.S.S.R.; Vasilij Fedotov, Moskwa, U.S.S.R.; Vladimir Gavrilin, Moskwa, U.S.S.R.; Ernest Gudumov, Moskwa, U.S.S.R.; Vladimir Semenov, Moskwa, U.S.S.R.; Igol Achmatov, Moskwa, U.S.S.R.; Nikolaj Majdurov, Moskovsk, U.S.S.R.; Evgenij Abraamov, Moskwa, U.S.S.R.

[73] Assignees: Brennstoffinstitut Freiberg, Freiberg, German Democratic Rep.; Gosudarstwennyi Nautschno-Issledowatelskij i Projektnyi Institut Astonoj Promyschlennosti i Produktow Organitscheskogo Sintesa, Moscow, U.S.S.R.

[21] Appl. No.: 122,686

[22] Filed: Feb. 19, 1980

[51] Int. Cl.³ ............................................. C10J 3/72
[52] U.S. Cl. ........................................ 48/67; 52/248; 122/5; 122/510; 122/511; 165/82; 165/162; 422/202

[58] Field of Search ............... 48/62 R, 63, 67, 64, 48/77, 76, 95; 122/5, 510, 511, 18, 249, 250 R, 6, 493; 422/202; 165/82, 83, 162, 163; 52/245, 248

[56] References Cited

U.S. PATENT DOCUMENTS

| 850,818 | 4/1907 | Cape et al. | 122/249 |
|---|---|---|---|
| 2,703,559 | 3/1955 | Godshalk | 122/510 |
| 2,761,772 | 9/1956 | Atwell | 48/76 |
| 2,871,114 | 1/1956 | Eastman | 48/63 |
| 2,961,310 | 11/1960 | Steever | 48/63 |
| 3,139,866 | 7/1964 | Lumm et al. | 122/6 A |
| 3,696,573 | 10/1972 | Zerna et al. | 52/248 |
| 3,921,708 | 11/1975 | Brenner | 165/163 |
| 4,078,903 | 3/1978 | Eales | 48/77 |

FOREIGN PATENT DOCUMENTS

| 266180 | 9/1964 | Australia | 48/76 |
|---|---|---|---|
| 1073797 | 6/1967 | United Kingdom | 52/248 |

Primary Examiner—S. Leon Bashore, Jr.
Assistant Examiner—Michael L. Goldman
Attorney, Agent, or Firm—Michael J. Striker

[57] ABSTRACT

The reactor for the production of CO and $H_2$ containing gases by means of a partial oxidation of powdery or liquid high ash fuels in a carburation fluid including free oxygen, at high temperatures and increased pressure, includes a pressure vessel enclosing a gas-tight housing whereby an interspace is formed between the inner wall of the vessel and the outer surface of the housing. Within the housing is arranged a cooling wall enclosing the reaction chamber proper. The cooling wall includes a coil of cooling pipes embedded in a mass of refractory material such as silicium carbide. The pipes are partially supported on web sections projecting from the inner surface of the housing into the refractory lining. The web sections prevent propagation of leaking hot gas from the reaction chamber along the inner surface of the housing.

6 Claims, 3 Drawing Figures

REACTOR FOR PRODUCING A CARBON MONOXIDE AND HYDROGEN CONTAINING GAS

BACKGROUND OF THE INVENTION

This invention relates generally to reactors for producing gases containing carbon monoxide and hydrogen by means of partial oxidation of finely subdivided solid or liquid fuels, particularly high ash fuels, the partial oxidation process taking place at high temperatures and increased pressure in an atmosphere of a carburation fluid containing free oxygen.

In producing gases from powdery or liquid fuel by means of partial oxidation, the fuel reacts in flame reaction with the oxygen containing carburation fluid. Dependent on the type of the fuel and on the application of the gas, the final temperatures of the reaction are between 1,200° and 1,600° C. whereas the flame itself can reach temperatures over 2,000° C. In the case when high ash fuels are employed, the mineral residues during the partial oxidation process are brought into a molten condition.

The flame reaction takes place in a refractory reaction chamber having as a rule a rotation-symmetrical shape whereby known-gas producing methods differ from one another by the arrangement of the burners and by the mode of discharge of the generated hot crude gas and of the molten slag. Such known gas generating processes of the aforedescribed type are frequently performed under an increased pressure, such as, for example, 3 MPA. Known reactors for such pressure processes consist for example of an outer pressure vessel in the interior of which the actual reaction chamber takes place. The shape of the reaction chamber is determined by its walls which include water-cooled pipes. The tubular walls at the sides adverse to the flame are covered with a layer of a refractory tamping or tamped mass, such as for example, on the basis of silicium carbide. The adherence of the temping mass to the cooling pipes is insured by holding pins having a diameter of 10 millimeters, for example, and a length of 10 millimeters. The holding pins are secured to the upper surface of the pipes by welding and project into the layer of the tamping mass. The thickness of the refractory later is adjusted such that its upper surface temperature is lower than the solidification temperature of the molten slag produced during the process of the partial oxidation. Accordingly, during the operation of the reactor an additional layer of solidified slag is formed on the upper surface of the tamping mass with solid layer changing gradually into a pasty zone and finally into a liquid slag film which continuously flows off. The cooling of the tubular wall can be effected by a pressurized water having a temperature below the boiling point or at the boiling point.

The purpose of the tubular wall is to reliably protect the outer pressure jacket against overheating due to radiation and convection heat flows. A thermally insulating multiple layer of refractory material is therefore provided between the tubular wall and the outer pressure jacket. Due to expansion joints in the brick lining and due to unavoidable fissures and the porosity of the refractory material, this multiple insulating layer has unavoidably a considerably and locally unpredictable permeability to the gas. As a consequence, when the reactor as usual is ignited at an approximately atmospheric pressure and when brought to a hot condition and subject to the full operational pressure, the rapid pressure increase may cause leakage currents to such an extent that the pressure jacket may become locally overheated. The same danger may take place when due to high output or due to a partial clogging by slag increased pressure differences within the reaction chamber and in the discharge channel for the crude gas are generated.

As a rule, it is possible to operate the cooled tubular wall at temperatures above the steam condensation point while the temperature of the pressure jacket remains under this condensation point. Nevertheless the gas permeability of the insulating layer results in a condensation of steam on the pressure jacket and contributes to its corrosion.

It has been devised to rinse the refractory layer or the joints in the refractory layer by an inert gas. The gas permeability of the refractory layer which cannot be at least for a period of time localized diminishes however even at large quantities of rinsing inert gas the effect of the proposed measure. Embodiments of reactors having cooled tubular wall structures are known in which the individual pipes are arranged side-by-side and interconnected by welded webs extending over the entire length of the cooling pipes. In this manner the tubular wall becomes gas-tight. The communication between the reaction chamber and the interspace between the tubular wall and the pressure jacket which is necessary for the pressure equalization is limited to one or more controllable openings rinsed by an inert gas.

This prior art solution results in very solid construction of the tubular wall having an additional advantage in a simple mounting structure and easy assembly. The rigidity of the tubular wall on the other hand has the following disadvantages:

During the start and the termination of the operation and in the case of change of the load it cannot be avoided that the tamping mass and the solidifed slag either expand or contract. The rigidly welded tubular wall structure, however, cannot accommodate itself to such length variation and consequently displacement of the tamping mass from the tubular wall frequently takes place. The exposed parts of the cooling pipes or of the jackets due to the displacement of the refractory mass are subject to multiple thermal load which in turn may cause an endangerment of the reactor due to local overheating.

SUMMARY OF THE INVENTION

It is therefore a general object of the present invention to overcome the aforementioned disadvantages.

More particularly, it is an object of the invention to provide an improved reactor for producing gas by partial oxidation under pressure of powdery or liquid high-ash fuel in which the pressure jacket is reliably protected against overheating and against the effects of the crude gas.

Another object of this invention is to provide such an improved reactor which has a long working life.

Still another object of this invention is to provide such an improved reactor the reaction chamber of which is easy to install into and remove from the outer pressure jacket.

An additional object of this invention is to provide such an improved reactor where lining of tamping mass in the reaction chamber withstands increased operational strains.

In keeping with these objects and others which will become apparent hereafter, one feature of the invention resides, in a reactor for a partial oxidation under high pressure of a powderized and/or liquid fuel, in the provision of an outer pressure vessel, a gas-tight housing arranged in the vessel and defining therewith an interspace, a cooling wall adjoining the inner surface of the housing and enclosing a reaction chamber, the cooling wall including coiled cooling pipes embedded in a refractory lining, webs secured to the inner surface of the housing along a helical line corresponding to the pitch of the coiled pipes, the webs projecting into the refractory lining to divide the inner surface of the housing into several sections, the cooling wall and the gas-tight housing defining at least one opening communicating with the interspace and at least one connecting conduit opening into the interspace to introduce an inert gas therein.

The solution of the reactor of this invention is characterized by the following features:

The coil of cooling pipes is spaced apart from the inner surface of the gas-tight housing at a distance of about 1 to 5 centimeters, whereby the interspace between the coiled pipes and the housing is filled up with tamped refractory mass.

The web projecting from the inner surface of the gas-tight housing is divided into several sections which project in the adjoining refractory tamping lining. The purpose of these web sections is to prevent the propagation of leaking currents of hot gas which in the course of the operation of the reactor penetrate through unavoidable fissures and cracks in the refractory lining and might spread over large surface areas of the gas-tight housing. In addition, the helical web sections serve also for the purpose to have the tubular wall in a fixed position without the necessity of a rigid connection between the web and the coiled piping of the cooling wall. The housing itself, as mentioned above, is inserted into the outer pressure vessel.

The interspace between the pressure vessel and the housing communicates through one or more openings with the reaction chamber in the housing. One or more inlet conduits for an inert gas is connected to the outer pressure vessel, and communicates with the aforementioned interspace to rinse the gas-tight housing with the inert gas.

In a preferred embodiment of this invention the reaction chamber has the configuration of an upright cylinder, the end faces of which are provided with coaxial openings for receiving at the upper end of the reactor a coaxial burner and at the lower end of the reactor a tubular discharge port for the crude gas and the molten slag. The cylindrical jacket of the tubular cooling wall includes the coiled cooling pipes formed of one or more parallel tubes forming a single- or a multiple-thread winding. The inlet and outlet ends of the coil extend through the housing and through the outer pressure vessel by means of easily releasable pressure resistant bushings of a suitable known construction. The coiled pipes as mentioned above, are supported on one or more helical webs mounted on the inner wall of the housing and projecting into the refractory lining below the assigned portions of the coiled pipes.

According to one feature of this invention the length of one wall supporting web section corresponds to one winding of the coiled cooling pipes. The ends of each web section are connected by an additional upright web the outer edge of which is shaped according to the outer outline of the coiled pipes that means it is provided with a plurality of semi-circular recesses corresponding to the number of parallel pipes in each winding.

As mentioned above, the interspace between the cooling coiled pipes and the inner wall of the housing is embedded in the refractory tamping mass.

According to still another feature of this invention the refractory tamping mass or lining together with the tubular coil is united with the housing preferably by welding. The inlet and outlet end portions of the pipes extend through openings in the wall of the housing so that a single structural unit is formed that can be installed as a whole into the outer pressure vessel or, upon loosening of the pressure resistant bushings for the projecting end portions of the pipes, the housing unit can be also easily removed from the pressure vessel.

According to still another feature of this invention, the connecting passages or openings between the reaction chamber and the interspace between the outer pressure vessel and the gas-tight housing enable that the inert gas can be easily applied so as to prevent the entry of the crude gas in this interspace and a minimum of the inert gas is used for spraying the connecting passages. Only in the case of the pressure increase in the reaction chamber during the starting of the combusting operation the amount of the inert gas is to be adjusted to such an extent, in dependency on the size of the free volume of this interspace and on the gradient of the pressure increase in the reaction chamber that the velocity of the flow of the inert gas from the interspace into the interior of the housing be always larger than zero.

By virtue of the fact that the cooling pipe rests on the supporting webs by its own weight only without any rigid connection, the individual cooling pipes or pipe windings have sufficient elastic deformability to permit the entire cooling wall to yield to thermal expansion and contraction of the embedding refractory lining, the latter being in the form of tamped mass covered in the interior of the reaction chamber with solidified and pasty layers of the slag. As a consequence the danger of peeling or chipping off of the lining from the pipes is substantially diminished. In addition, this invention permits well defined spraying of the inner wall of the outer pressure vessel so that thermal and corrosive effects of the crude gas on the jacket of the pressure vessel can be avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
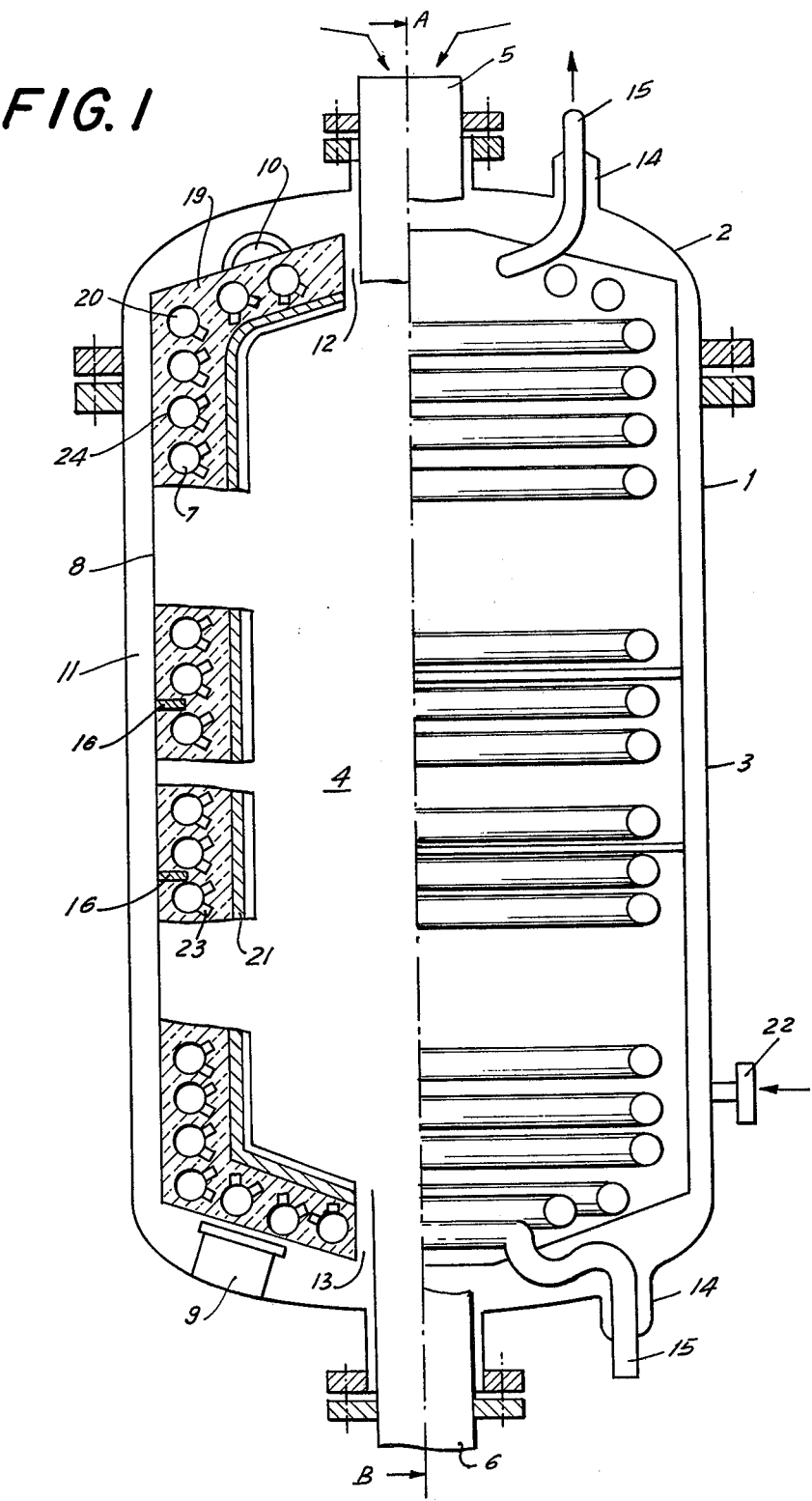
FIG. 1 is a schematic sectional view of a reactor for a partial oxidation under an increased pressure of powdery fuels.

Referring firstly to FIG. 1, the illustrated reactor is designed for gasification of brown coal dust having approximately 10% ash contents. The gasification is effected by a partial oxidation by means of a technical oxygen. The reactor includes an outer pressure vessel 1 assembled of a cylindrical body 3 closed by a top cover 2 mounted to the latter by a fastening flange. The top of the cover 2 and the bottom of the cylindrical body 3 are provided with coaxial openings for receiving respectively a burner 5 and a discharging and cooling device 6. The burner insert 5 includes also devices for igniting the reactor and devices for measuring temperature in the reaction chamber 4. The final operating temperature in the reaction chamber 4 is about 1400° C. and the pressure in the reaction chamber reaches about 3.0 MPA and at this temperature and pressure a technical oxygen and finely divided brown coal dust react with each other in a flame to produce a CO and $H_2$ containing coal gas, The produced crude gas is discharged at the aforementioned temperature of 1400° C. together with molten slag through the discharge and cooling port 6 and upon separating the slag the crude gas is fed for a further processing.

Figure 2:
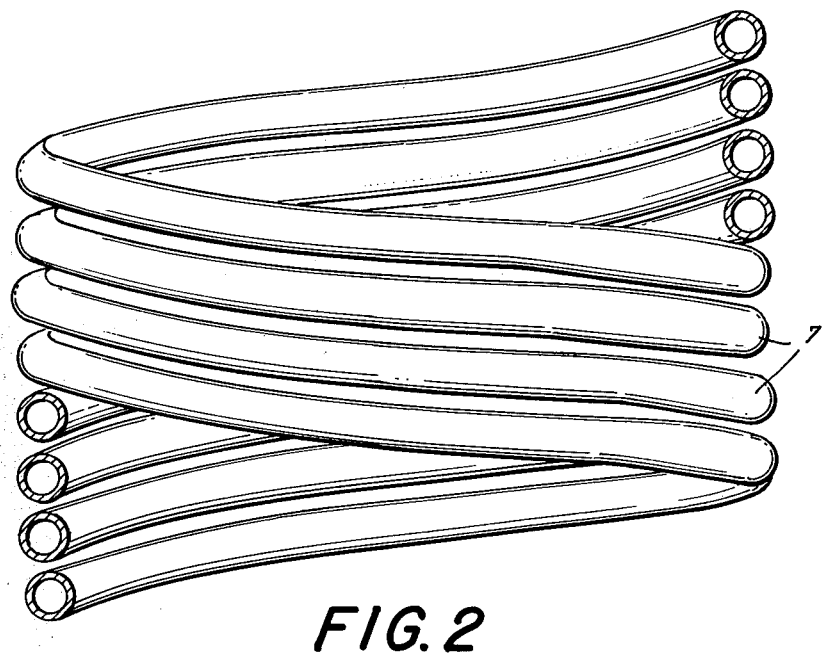
FIG. 2 is a perspective view of a cut-away portion of a multi-thread coil of cooling pipes.

The reaction chamber 4 is enclosed in a four-pipe coil of cooling pipes 7. For the sake of clarity only one pipe coil 7 is illustrated in FIG. 1. A four-pipe coil assembled of four parallel tubes 7 is illustrated in the perspective view of FIG. 2.

Figure 3:
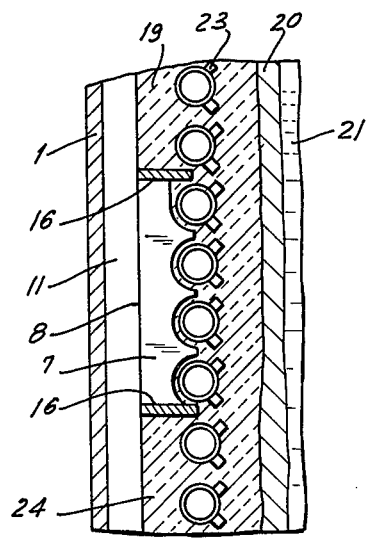
FIG. 3 is a sectional of a cut-away portion of the reactor of FIG. 1 taken along the line A-B.

As seen in greater detail in FIG. 3 the surface portions of respective pipes 7 facing the interior of the reactor are provided with welded holding pins 23 for supporting the inner part of the refractory lining 18 in which the coiled tubes are embedded.

The tubular coil 7 is situated in a gas-tight housing 8 which in contrast to the jacket of the outer pressure vessel is made of a relatively thin metal sheet. The distance between the coiled pipes 7 and the inner surface of the housing 8 is about 2 centimeters. The housing 8 rests on supporting blocks 9 on the bottom surface of the pressure vessel 3 so that the weight of the housing 8 and of the cooling lining 7 and 19 is transmitted to this pressure vessel.

To facilitate the assembly of the reactor, the top face of the housing 8 is provided with lifting eyes to which a lifting tool is inserted when the housing is placed in or removed from the lower portion 3 of the pressure vessel 1. The interspace 11 resulting between the housing 8 and the pressure vessel 1 communicates with the reaction chamber 4 through an upper annular gap 12 between the burner insert 5 and the top opening in the cylindrical housing 8. Another connecting passage between the reaction chamber 4 and the interspace 11 takes place between the wall of the lower opening 13 of the housing 8 and the tubular jacket of the discharge and cooling device 6 for the crude gas. A lateral connecting conduit 22 opens also into the interspace 11 for introducing therein a spray of an inert gas such as nitrogen which enters through the annular passages 12 and 13 into the reaction chamber 4. The upper and lower end portions 15 of the coiled pipes 7 extend through the wall of pressure vessel 1 by means of easily releasable welded bushings 14 provided both in the top cover 2 and at the bottom of the lower part 3 of the pressure vessel. These end portions 15 serve as connecting pieces for inlet and outlet conduits for cooling water. The water pressure in the cooling pipes is about 4.0 MPA and is thus larger than the pressure in the reaction space. The temperature of the incoming cooling water amounts to about 160° C. and is higher than the condensation point of the crude gas which is about at 150° C.

The entire upright inner surface of the housing 8 is welded to a plurality of webs 16 in the form of helical segments having the same pitch as that of the coiled pipes 7. The webs 16 are each rigidly connected to the housing 8 and project approximately to the center of the bottom part of the assigned pipe 7. The length of each web section 16 corresponds to a full winding so that the ends of the web are spaced apart opposite one another. As illustrated in FIG. 3 they are interconnected by an additional vertically directed web 17 the outer edge of which is shaped with four semicircular recesses 18 having the same radii and clearance as the radii and spacing of respective four pipes constituting one winding or thread of the pipe coil 7. The vertical web 17 in this manner engages in a comb-like manner the pipe coil 7.

The coiled pipes 7 are embedded in a lining of a refractory tamped mass (on the basis of silicium carbide) which is supported by the holding pins 23 as well as by the helical webs 16. In this manner, the lining 19 fills up both the interspace 24 between the coiled pipes 7 and the housing 8 as well as it forms the boundary wall portion between the pipes 7 and the reaction space 4. The thickness of the latter boundary wall portion of the refractory lining 19 is selected to be about 20 millimeters so that the temperature on the inner surface of the refractory lining 19 be lower than the solidifying temperature of the molten slag which is about 1100° C. As a result when the liquidified slag encounters the inner wall of lining 19 it forms on the inner surface of the lining 19 a solid slag layer 20 which transits into an intermediate pasty zone which finally changes into a film of liquid slag 21 (FIG. 3) which flows out through the discharge device 6. Regarding the thickness of the solid and liquid slag layers an equilibrium adjusts itself during the operation of the reactor depending on the temperature, the heat conducting conditions and the efficiency of the flame reaction in the reaction chamber 4 and on the other hand, the thickness of respective slag layers also depends on the intensity of the cooling action and on the heat conductivity of the refractory lining 19 and of the cooling coil 7.

The refractory lining 19 of the tamping mass together with the solidified slag layer 20 form a relatively rigid and strong union which, however, particularly during the starting or terminating processes in the reactor operation are due to the changes of the operating conditions subject to thermal expansions and contractions. Due to the relatively loose support of the coiled pipes on the helical webs there results a sufficiently high flexibility of the coiled pipe 7 relative to the enclosing mass 19 and the pipes can adjust themselves to the thermal movements of the tamping mass and of the slag layer. In this manner, the danger of peeling off the tamping mass from the pipes is condiderably reduced. If cracks or fissures occur during the operation of the reactor in the lining 19, the supporting web sectors 16 together with vertical web 17 prevent the propagation of leaking currents of hot crude gas beyond the limits of the supporting webs so that the gas cannot adversely affect larger areas of the inner wall of the housing 8 and the latter is protected against overheating. The housing 8 adjusts itself to a temperature which corresponds approximately to an average temperature of the cooling agent in the coiled pipe 7 (approximately 180° C.). In this manner the condensation of steam is prevented. The amount of inert gas such as nitrogen which is supplied through the connecting piece 22 into the interspace 11 between the outer pressure vessel 1 and housing 8 is for the normal operation of the reactor adjusted such that the velocity of the stream of the inert in the annular passages 12 and 13 at the top and at the bottom of the reaction chamber is about 0.2 meters/seconds. Only in operational phases during which the pressure in the reaction chamber 4 is increased, the normal pressure of the stream of the cooling inert nitrogen is increased to a value which is slightly higher than the following expression:

$$V_{zw} \cdot \Delta P / \Delta \tau \cdot 1 / P_o$$

where $V_{zw}$ denotes the volume of the interspace 11, $\Delta / \Delta \tau$ denotes the pressure increase during a time unit $P_o$ denotes the normal pressure of the inert gas.

As a result the nitrogen atmosphere prevails on the inner surface of the jacket of the outer pressure vessel 1 and the condensation of steam from the crude gas is avoided. In order to reduce the temperature of the outer pressure vessel 1 to a value which is comfortable for the attending personnel, the inner wall of the outer vessel 1 is provided with a thin insulating layer.

It will be understood that each of the elements described above, or two or more together, may also find a useful application in other types of constructions differing from the types described above.

While the invention has been illustrated and described as embodied in a reactor for partial oxidation of powdery fuels, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A reactor for partial oxidation under increased pressure of a powderized and/or liquid fuel, comprising: an outer pressure vessel; a gas-tight housing arranged in said vessel; said housing being spaced apart from the inner wall of said vessel to bound an interspace therewith; a cooling wall adjoining the inner surface of said housing and enclosing a reaction chamber, said cooling wall including coiled cooling pipes embedded in a lining of tamped refractory material; circumferential webs connected to the inner surface of said housing and projecting into said refractory material, the length of each web corresponding substantially to one winding of the coiled pipes to prevent propagation of leaking currents of hot gas from the reaction chamber beyond sections of the inner surface delimited by the webs; at least one passage in said cooling wall and said housing for establishing communication between said reaction chamber and said interspace; at least one connecting conduit opening into said interspace to introduce an inert gas therein; said cooling wall having a cylindrical configuration and including a cooling coil formed of a plurality of adjoining pipes; each of said circumferential webs being in the form of a helix with ends vertically spaced from each other and at least one additional vertical web section secured to the inner surface of said housing and projecting into said refractory material, the outer edge of said vertical additional web section including a plurality of semicircular recesses to fit said pipes and the ends of said additional vertical web interconnecting the vertically spaced ends of respective circumferential webs.

2. The reactor as defined in claim 1 wherein said pressure vessel is assembled from two parts and said housing together with said cooling wall is insertable as a unit into said pressure vessel.

3. The reactor as defined in claim 1 wherein respective cooling pipes are provided with holding pins directed toward said reaction chamber to support the innermost part of said refractory lining.

4. A reactor as defined in claim 1, wherein said webs loosely support said pipes in said refractory material.

5. A reactor as defined in claim 1, wherein each of said circumferential webs has a helical form of the same pitch as that of the coiled pipes.

6. A reactor as defined in claim 5, wherein said circumferential webs project into said tamped refractory material between the winding of two adjacent pipes.

* * * * *